US009165333B2

(12) United States Patent
Hoffmann

(10) Patent No.: US 9,165,333 B2
(45) Date of Patent: Oct. 20, 2015

(54) SYSTEMS AND METHODS FOR SUPPLY CHAIN EVENT VISUALIZATION

(75) Inventor: Florian Hoffmann, Ladenburg (DE)

(73) Assignee: SAP SE, Walldorf (DE)

( * ) Notice: Subject to any disclaimer, the term of this patent is extended or adjusted under 35 U.S.C. 154(b) by 1906 days.

(21) Appl. No.: 12/334,814

(22) Filed: Dec. 15, 2008

(65) Prior Publication Data

US 2010/0153870 A1  Jun. 17, 2010

(51) Int. Cl.
  *G06F 3/048* (2013.01)
  *G06Q 50/22* (2012.01)
  *G06Q 10/06* (2012.01)
  *G06Q 10/08* (2012.01)

(52) U.S. Cl.
  CPC .............. *G06Q 50/22* (2013.01); *G06Q 10/06* (2013.01); *G06Q 10/08* (2013.01)

(58) Field of Classification Search
  USPC ........................................................ 715/853
  See application file for complete search history.

(56) References Cited

U.S. PATENT DOCUMENTS

| 6,897,885 | B1 * | 5/2005 | Hao et al. ....................... 715/853 |
| 7,050,997 | B1 * | 5/2006 | Wood, Jr. ..................... 705/36 R |
| 2002/0140725 | A1 * | 10/2002 | Horii ............................. 345/736 |
| 2002/0149623 | A1 * | 10/2002 | West et al. ..................... 345/765 |
| 2003/0136828 | A1 * | 7/2003 | Takesada et al. ............. 235/380 |
| 2004/0162675 | A1 * | 8/2004 | Moon et al. ....................... 702/3 |
| 2005/0265083 | A1 * | 12/2005 | Perry ....................... 365/189.01 |
| 2006/0173617 | A1 * | 8/2006 | Sladky et al. ................. 701/211 |
| 2008/0045138 | A1 * | 2/2008 | Milic-Frayling et al. .... 455/3.04 |

OTHER PUBLICATIONS

Kapler, Thomas et al., "Correlating Events with Tracked Movements in Time and Space: A GeoTime Case Study", In Proceedings of the 2005 Intelligence Analysis Conference, Jan 2005, 2pgs.
Cheung, C. M. et al., "An RFID Enabled Topology Visualization System for Supply Chain Management", Annual Journal of IIE (HK) 2005-2006, vol. 26, [pp. 61-70], total 10pgs.
Shuping, David et al., "GeoTime Visualization of RFID Providing Global Visibility of the DoD Supply Chain", Copyright 2005 Oculus Info Inc., 6pgs.
GeoTime, "Visualization for Tracking and Network Analysis in Time and Space", Copyright 2008 Oculus Info Inc., 6pgs.

* cited by examiner

*Primary Examiner* — Angie Badawi
(74) *Attorney, Agent, or Firm* — Buckley, Maschoff & Talwalkar LLC

(57) ABSTRACT

According to some embodiments, an event query to an item supply chain event database is processed such that a trace extraction algorithm will be executed to determine extracted trace data. A plurality of location nodes may then be graphically represented on an interactive user display based on the extracted trace data. Similarly, a plurality of item flow edges connecting location nodes may be graphically represented on the interactive user display based on the extracted trace data. According to some embodiments, a selection from a user is received via the interactive user display, the selection being associated with at least some of the graphically represented information. Responsive to the received selection, the graphical representation may be adjusted in accordance with the extracted trace data.

3 Claims, 15 Drawing Sheets

SYSTEMS AND METHODS FOR SUPPLY CHAIN EVENT VISUALIZATION

FIELD

Some embodiments of the present invention may relate to supply chain event visualization. In particular, some embodiments may comprise systems and methods to display supply chain events to a user.

BACKGROUND

A product typically passes through various points in a "supply chain" between a producer of the product and a consumer. For example, a product might start at a factory an then be shipped to a warehouse in another country. The product might then be transported to a retail store and eventually sold to a consumer.

In some cases, counterfeiting, or the unauthorized and/or illegal copying of a product, may cause considerable economic damage to a company or even a greater economy. For example, an unauthorized copy of a luxury item might be inserted into the supply chain between a warehouse and a retail store. To help detect such counterfeiting, a company might try to make the product more difficult to accurately copy (e.g., by incorporating a hologram). These approaches may be of only limited use, however (e.g., because a retailer or consumer might not carefully inspect products).

As another approach to deter counterfeiting, a product code might be associated with authentic products. These codes might then be used to monitor the movement of products through a supply chain. For example, the Electronic Product Code (EPC) global network uses EPC Information Services (EPCIS) to help gather data that be used to track and trace the movement of products. The presence of a valid product code can then be used to verify that a product is not counterfeit. In such cases, it may be simple to detect when a counterfeiter has simply omitted a product code or used a completely fictional code.

There are a number of other techniques, however, that counterfeiters can use to avoid detection when codes are applied to products. For example, in a "transfer" strategy a counterfeiter might take a product code from a genuine item and transfer that same code to a counterfeit item. Similarly, in a "reuse" strategy the counterfeiter might copy a product code of a genuine item and re-used that code in connection with a counterfeit item (that is, compared to the "transfer" strategy a "reuse" strategy may be associated with removing an item identifier from an item that has been observed to be destroyed). As still another approach, a counterfeiter might employ a "randomize" strategy in which a random product code is generated and assigned to a counterfeit item (e.g., the random code might have a valid front portion but a randomized serial number). In other cases, a "duplicate" strategy might be tried where the counterfeiter duplicates an authentic product code and attaches it to multiple counterfeit items.

Approaches that may improve the ability of a user to view information about items moving through a supply chain could, therefore, be desirable. Moreover, it may be advantageous to provide one or more tools that facilitate a user's ability to detect potential counterfeit items in an efficient and convenient manner.

DETAILED DESCRIPTION

Figure 1:
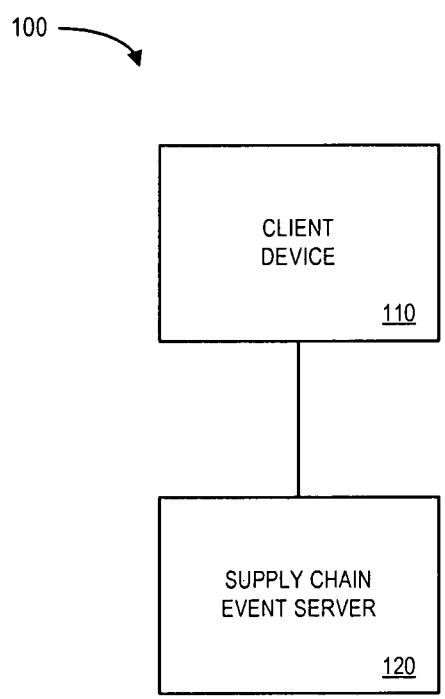
FIG. 1 is a block diagram of a supply chain event visualization system according to some embodiments.

To alleviate problems inherent in the prior art, some embodiments of the present invention introduce systems, methods, computer program code, and means providing supply chain event visualization for a user. For example, FIG. 1 is a block diagram of a supply chain event visualization system 100 according to some embodiments. In particular, the system 100 includes a client device 110 coupled to a supply chain event server 120.

According to some embodiments, the client device 110 communicates with a remote supply chain event server 120. Note that elements described herein as communicating with one another may be directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between remote systems may proceed over any one or more transmission protocols that are or become known, such as Asynchronous Transfer Mode (ATM), Internet Protocol (IP), Hypertext Transfer Protocol (HTTP), and/or Wireless Application Protocol (WAP). Although a client device 110 is illustrated in FIG. 1, note that any number of client devices 110, as well as the other elements described herein, may be provided.

Note also that some or all of the devices illustrated in FIG. 1 (as well as the other systems described herein) may use processor-executable program code read from one or more of a computer-readable medium, such as a floppy disk, a CD-ROM, a DVD-ROM, a magnetic tape, and a signal encoding the process, and then stored in a compressed, uncompiled and/or encrypted format. Further note that embodiments are not limited to any specific combination of hardware and software.

Figure 2:
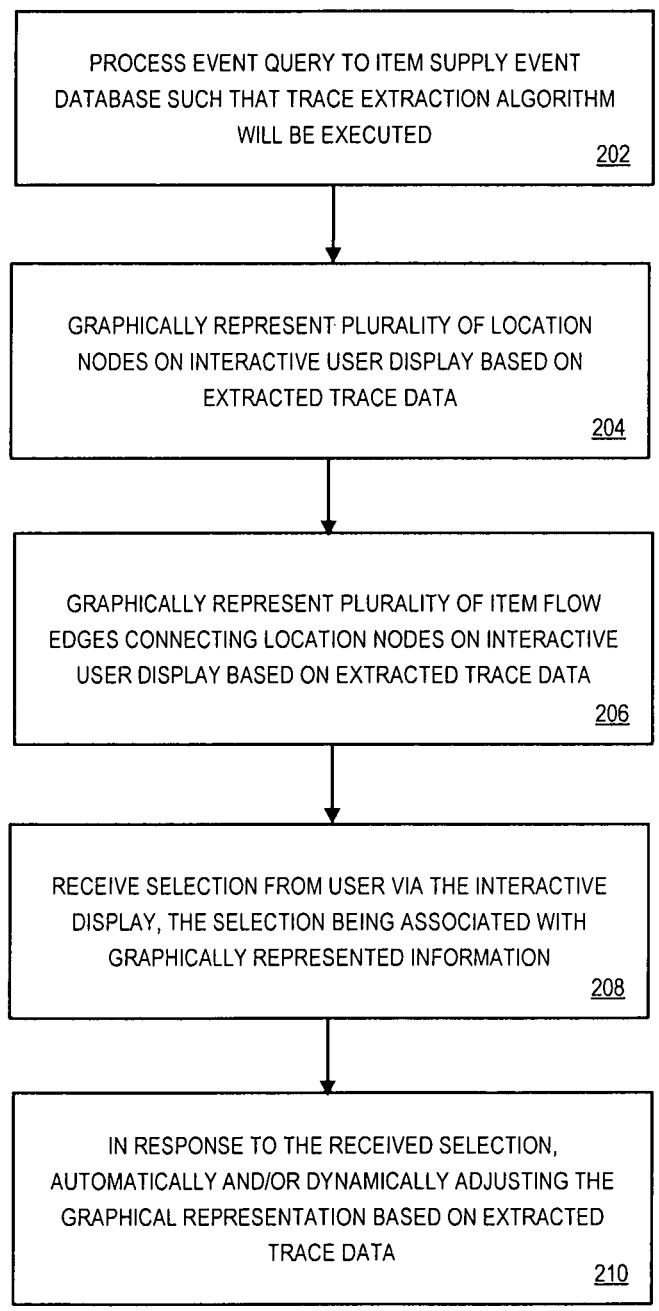
FIG. 2 is a flow diagram of a method providing an interactive user interface pursuant to some embodiments of the present invention.

A user may access the client device 110 to request and/or obtain information about supply chain events in accordance with any of the embodiments described herein. For example, FIG. 2 is a flow diagram of a method providing an interactive user interface pursuant to some embodiments of the present invention. The flow charts described herein do not necessarily imply a fixed order to the actions, and embodiments may be performed in any order that is practicable. Note that any of the methods described herein may be performed by hardware, software (including low level language code), firmware, or any combination of these approaches. For example, a storage medium may store thereon instructions that when executed by a machine result in performance according to any of the embodiments described herein.

At 202, an event query to an item supply chain event database is processed such that a trace extraction algorithm will be executed to determine extracted trace data. As used herein the term "item" might refer to, for example, a product and/or a product identifier (e.g., associated with goods to be eventually sold to consumers). Moreover, an item might be associated with a serial number, a Radio Frequency Identifier (RFID) tag, an optical bar code, or a product code, such as a Universal Product Code (UPC) symbol. As other example, an item might be associated with a financial product, digital information (e.g., a software application or television program), a set of items (e.g., a truckload or cargo container of items), a pharmaceutical item, and/or a service (e.g., a consumer warranty).

The event query might, for example, ask the item supply chain database for all "events" (e.g., when and where an EPC was read) associated with a particular type of item. Note that an event query might be processed, for example, by generating and/or transmitting such a query. According to some embodiments, an event query is processed by executing and/or responding to such a query.

According to some embodiments, a user query interface might be provided to help a user retrieve appropriate event data from an EPCIS repository. For example, the query interface at a client device 110 might ask the user to provide a Uniform Resource Locator (URL) (e.g., to identify events of interest and/or to define a repository) through which a query service can be accessed (and might also let the user verify that a given URL string is correct). In this way, a user may be able to select which types of products and/or events are of interest, and he or she may specify an arbitrary set of query parameters as defined in the EPCIS query language. Such an interface may provide the user with control over which supply chain events will be visualized. Note that the filtering done in connection with the query might be associated with, for example, a time window, product codes, particular companies, and/or a pre-determined number of events (e.g., a user might want to visualize the last 1,000 events that occurred in the supply chain). According to some embodiments, a link to a query interface is provided to let a user refine a query or use a pre-defined query template.

The "trace extraction algorithm" executed at 202 may be associated with, for example, a pre-processing of un-ordered EPCIS events. That is, given a set of EPCIS events, the trace extraction algorithm may extract the traces of all items found in the event set. Note that the "trace" of an item might be defined as, for example, a time-ordered list of all EPCIS events related to that item. It might represent, according to some embodiments, a trail of observations that can be used to re-construct and visualize an item's path through the supply chain. One example of a trace extraction algorithm is described herein with respect to FIG. 15.

At 204, a plurality of "location nodes" are graphically represented on an interactive user display based on the extracted trace data. Each location node might represent, for example, a geographic location, a business, a country, or a party to a transaction associated with an item (e.g., a buyer or seller). Note that location nodes might represent either physical or logical locations (or even a combination of both types of locations).

At 206, a plurality of item flow "edges" are graphically represented as connecting location nodes on the interactive user display based on the extracted trace data. Each item flow edge might represent, for example, the transfer or movement from one location to another.

Thus, this type of "item flow" view may provide a user information about the spatial flow of goods in the supply chain. Items may move from "read point" (e.g., where a product code is recorded) to read point, or, in an aggregate view, from one spatial aggregation of read points (e.g., including a read point in a particular warehouse or even in a particular country) to another. Such a visualization might, for example, let a user (who knows the usual or probable paths through the supply chain) draw conclusions about product authenticity (e.g., when item movements depart from the typical paths).

Figure 3:
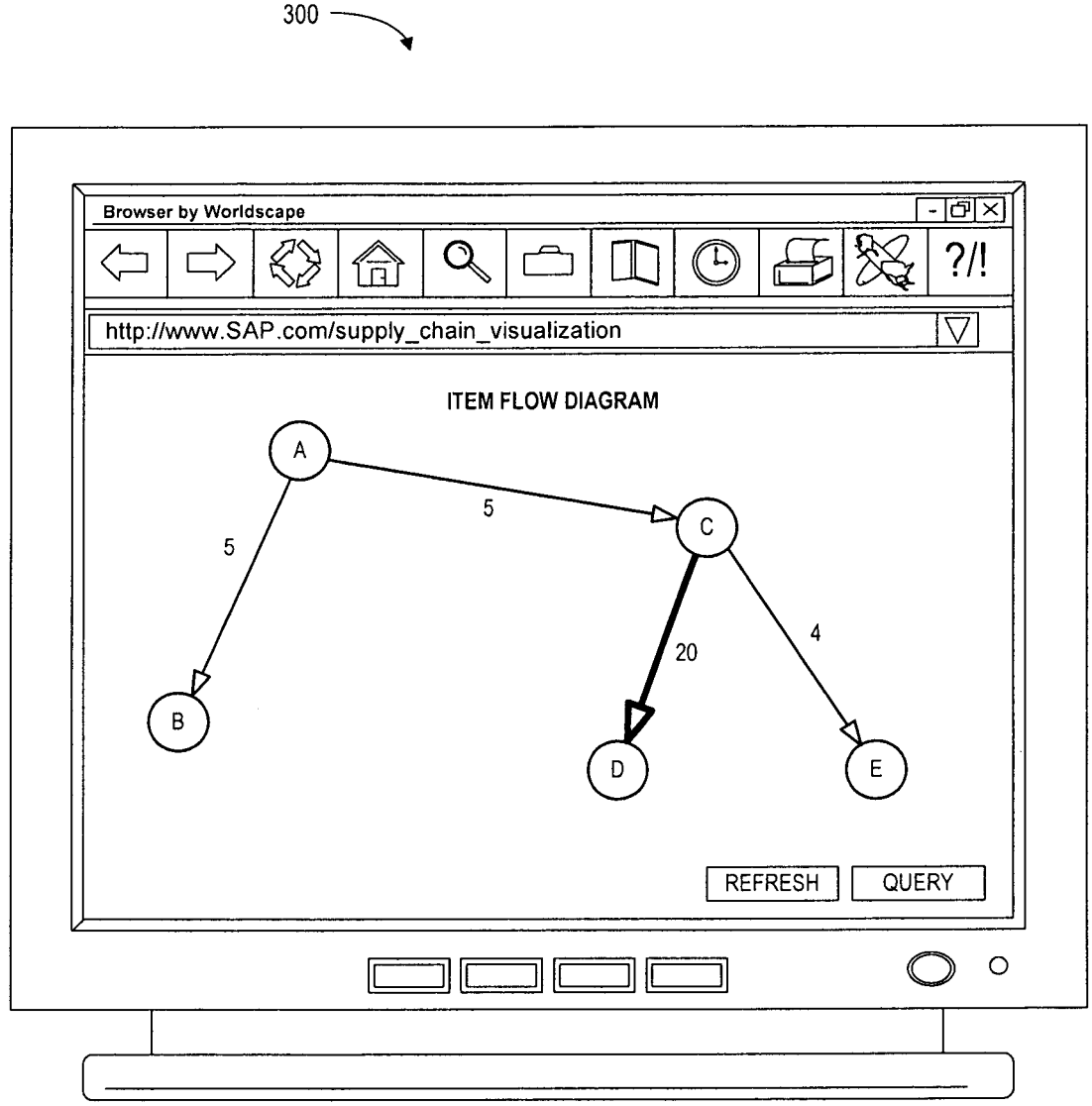
FIG. 3 illustrates an item flow diagram according to some embodiments of the present invention.

FIG. 3 illustrates an item flow diagram 300 according to some embodiments of the present invention. The diagram 300 includes location nodes (rendered as five circles on the display) representing locations A through E (which each might represent a product code read point or aggregation of read points). Moreover, item flow edges are rendered as arrows connecting the five location nodes, where each arrow or edge indicates movement of an item from one location to another. Note that an edge might, according to some embodiments, comprise a loop and connect a node to itself. For example, a circular arrow beginning and ending at the same node might be displayed.

In the diagram 300 of FIG. 3, each item flow edge is displayed alongside with a numerical value that indicates the number of items associated with the edge. For example, the diagram 300 indicates that "5" items have moved or transitioned from location A to location B.

According to some embodiments, a width or color of an item flow edge might further indicate information about the items moving between the location nodes. For example, the item flow edge from location C to location D in the diagram 300 is associated with a relatively large number of items (i.e., 20 items) and is therefore displayed as a darker and/or thicker arrow. As another example, edges associated with suspicious item movements might be colored red while normal edges are colored green.

Note that product code data, such as EPCIS data, is typically voluminous and/or highly dimensional. For example, each EPCIS event may include 11 data fields, two of which can comprise lists with an arbitrary number of elements (e.g., EPCs and business transactions). By extracting trace data of interest and providing a two-dimensional diagram 300 as illustrated in FIG. 3, the system may let a user efficiently and effectively detect a transfer of potentially unauthorized and/or counterfeit items. For example, even a casual user might be able to view the diagram 300 and determine that some of the location nodes and/or item flow edges seem to be implausible (e.g., and thus might indicate that a "reuse," "randomize," or "duplicate" strategy is being employed by a counterfeiter).

The display of FIG. 3 illustrates that a user might active a "refresh" selection (e.g., to update the diagram 300 with new data) or a "query" selection (e.g., to define a new query and thus display information about other types of products or events). Note, however, that such a display might include any number of other selections that could be used to filter the events that are presented on the diagram 300.

At 208, a selection is received from a user via the interactive user display, the selection being associated with at least some of the graphically represented information. For example, a user might click (or double-click) a graphically rendered location node or item flow edge on the diagram 300. At 210, the graphical representation may be automatically adjusted in accordance with the extracted trace data. As used herein, an operation may be "automatic" if may be performed with little or no user interaction. Moreover, according to some embodiments, the display and/or adjustment of a diagram may be dynamic (e.g., the display might be updated in near real-time as new events occur in a supply chain).

Figure 4:
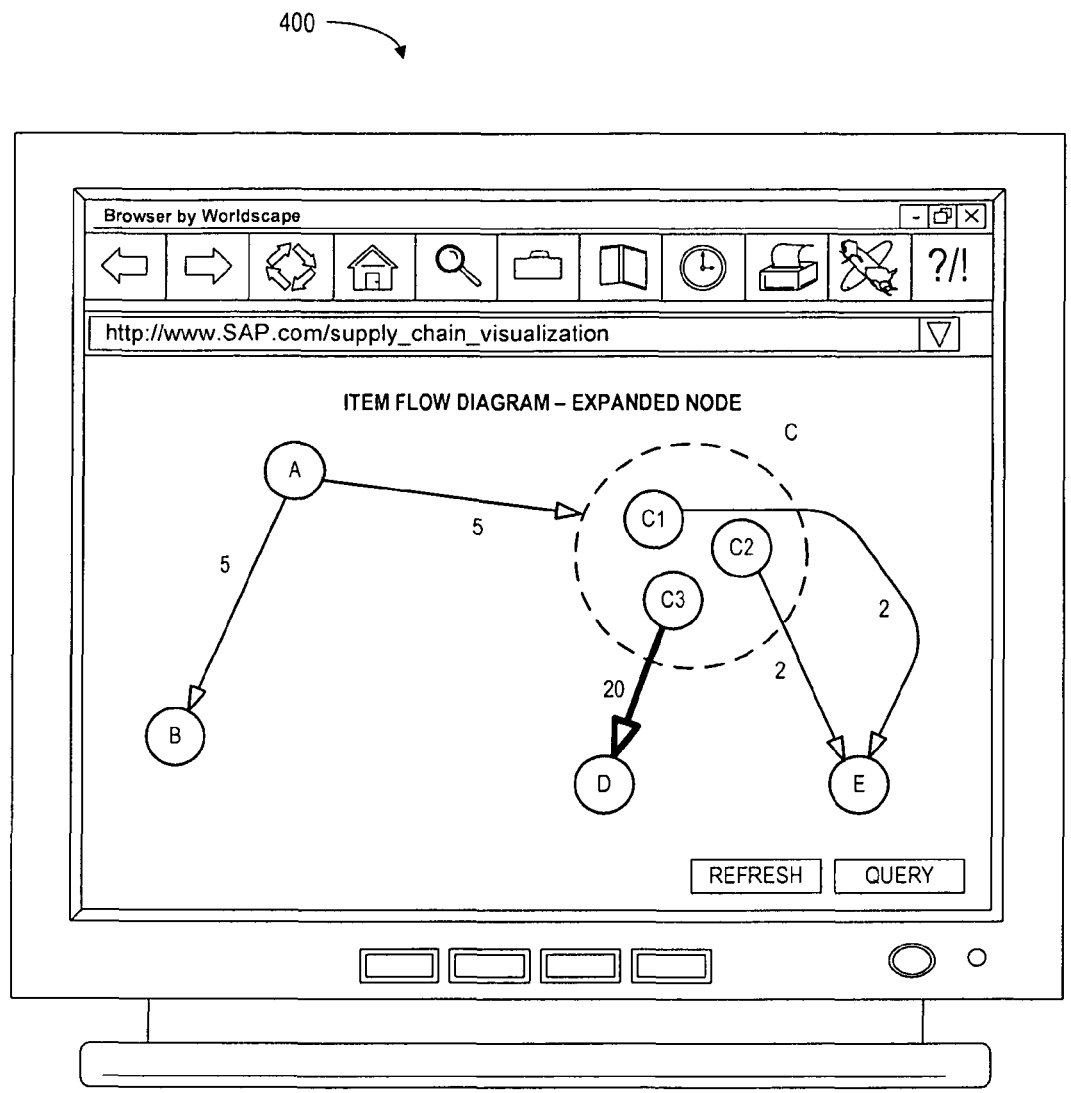
FIG. 4 illustrates an item flow diagram with an expanded location node according to some embodiments of the present invention.

By way of example, a user might select a particular location node at 208 and, in response to that selection, the automatic adjustment at 210 might include expanding that location node to display a plurality of "sub-location" nodes. FIG. 4 illustrates an item flow diagram 400 with an expanded location node according to some embodiments of the present invention. In this case, the user may have selected the node associated with location C (e.g., via the diagram 300 of FIG. 3). In response to the selection, that location node was expanded in the diagram 400 to display sub-location nodes C1, C2, and C3 in accordance with a location tree hierarchy (e.g., as automatically determined by the trace extraction algorithm). Such sub-nodes might be associated with, for example, a substructure of a location (e.g., inspection stations within a warehouse or subsidiaries within a corporation). Note that in some embodiments, the system might further graphically display new item flow edges and/or sub-edges between the sub-location nodes (e.g., another arrow could be added to the diagram 400 to indicate that an item has moved from C1 to C3). According to some embodiments, a user may provide a further selection to "collapse" the sub-nodes back to their original form.

Figure 5:
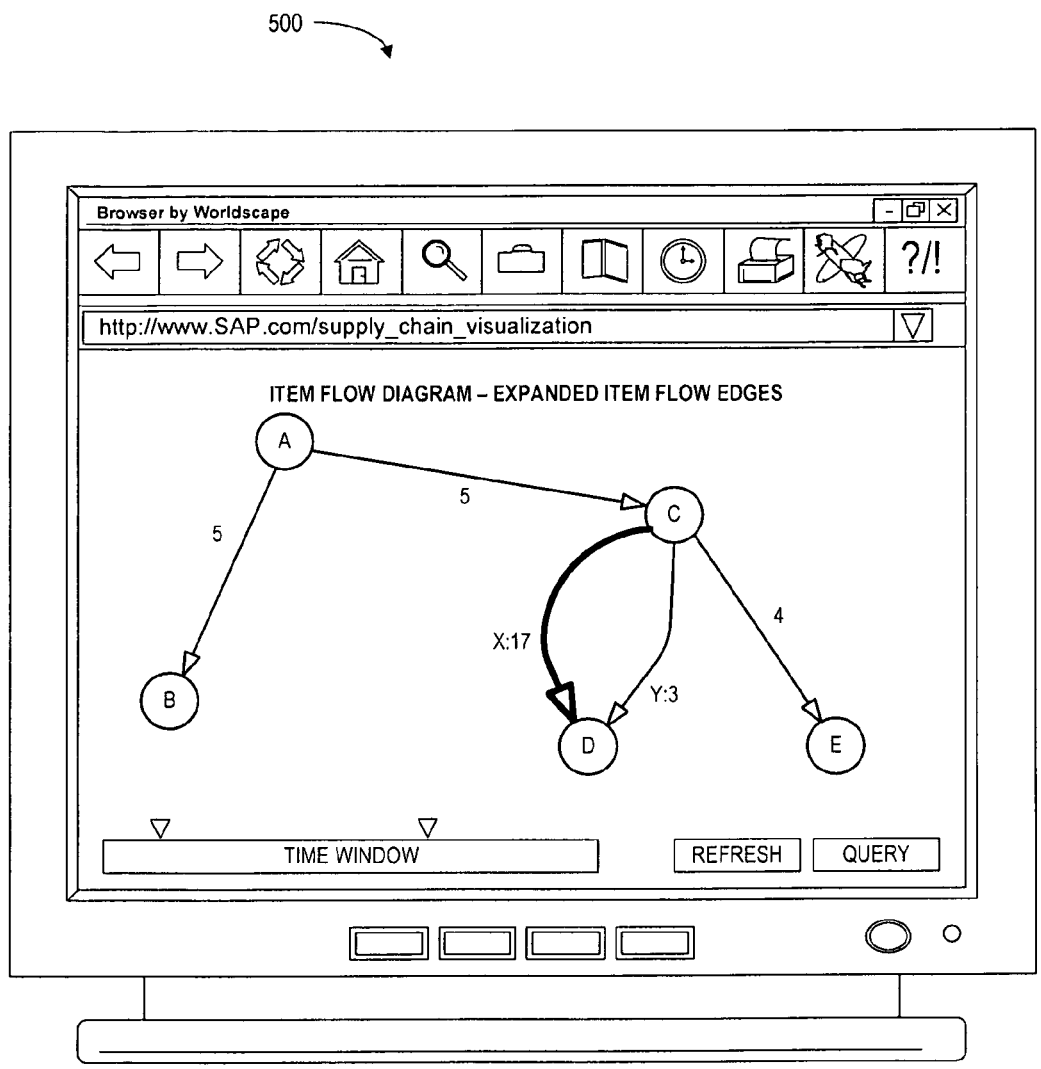
FIG. 5 illustrates an item flow diagram with an expanded item flow edge according to some embodiments of the present invention.

As another example, a user might select a particular item flow edge at 208 and, in response to that selection, the automatic adjustment at 210 might include expanding that item flow edge to display a plurality of item flow "sub-edges." A sub-edge may, for example, represent one of a plurality of edges incident on the same pair of vertices or nodes. FIG. 5 illustrates an item flow diagram 500 with an expanded item flow edge according to some embodiments of the present invention. In this case, the user may have selected the item flow edge from location node C to location node D (e.g., via the diagram 300 of FIG. 3). In response to the selection, that item flow edge was expanded to display two sub-edges, each associated with a particular type of item. In particular, a first sub-edge indicates that 17 items of type "X" and 3 items of type "Y" were transferred from location C to location D. Note that the sub-edges might also be associated with, for example, a flow type (e.g., delivered by air or truck) or a particular item. According to some embodiments, a user may provide a further selection to "collapse" the sub-edges back to their original form.

According to an of the embodiments described herein, selection of an item flow edge might result in a highlighting of that particular edge along with a retrieval of data about the items associated with that edge. The system may then also highlight all other edges, nodes, states, and/or timelines in a diagram that are associated with those items. Such an approach may, for example, help focus a user on an entire movement path of one or more items through the supply chain (e.g., in connection with an event sequence view described herein). This might be helpful, for example, when a particular view is crowded with information about many items and/or paths.

As still another example, an interactive user display might allow for the selection of a dynamically adjusted time window associated with the graphically represented information. For example, a user might select events from a start date or time to an end date or time. As another example, the user might ask to see all events that occurred in the last week or year. As still another example, the user might request that data representing the last 100 events be provided on an item flow diagram. According to some embodiments, such a selection received from the user via a graphical time slider control. For example, the diagram 500 of FIG. 5 illustrates a "Time Window" bar with a start time indicator and an end time indicator that can be adjusted by a user.

Figure 6:
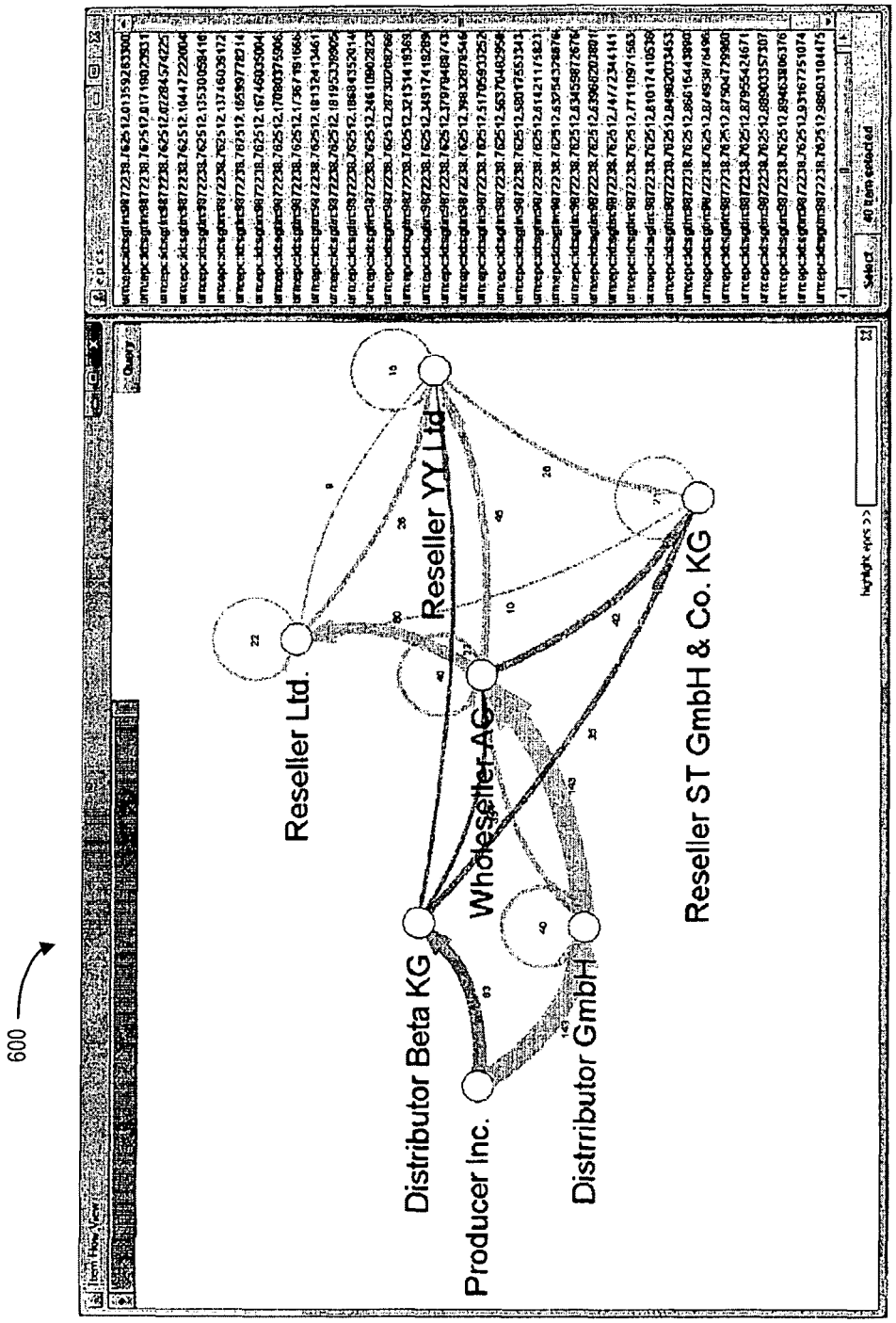
FIG. 6 is an example of an item flow diagram according to some embodiments.

Note that all of the displays provided herein, including those in FIGS. 3 through 5, are for illustration purposes only and an actual display may include fewer or additional elements. For example, a single view might include both expanded nodes and expanded edges. As another example, FIG. 6 is an example of an item flow diagram 600 according to some embodiments. Note that in such a diagram 600, at least one of the graphically represented location nodes or item flow edges provide information based on: (i) a size, (ii) a width, (iii) a length (e.g., longer arrows might be associated with greater average item shipment times), (iv) a simulated third dimension (e.g., location nodes might be drawn as cylinders having heights associated with how many items are currently stored at that location), (v) a color, or (vi) an animated feature (e.g., a suspicious item flow edge might be displayed as "flashing" on the user's display). In addition, the right most portion of the display 600 includes product code selection frame that may let a user focus on particular items or types of items.

Figure 7:
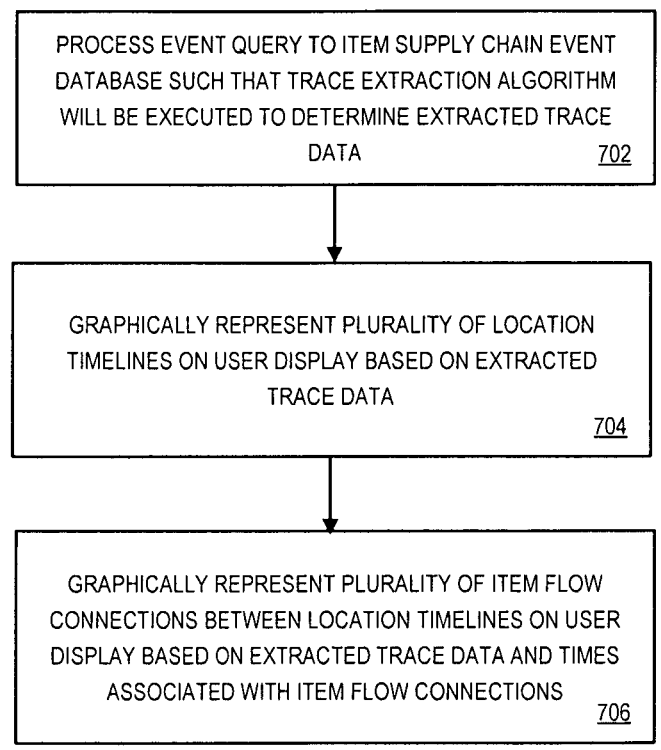
FIG. 7 is a flow diagram of a method providing an event sequence diagram pursuant to some embodiments of the present invention.

Note that embodiments described herein may be used to provide visualizations other than "item flow diagrams" as described in connection with FIGS. 2 through 6. For example, FIG. 7 is a flow diagram of a method providing an "event sequence diagram" pursuant to some embodiments of the present invention.

At 702, an event query to an item supply chain event database is processed such that a trace extraction algorithm will be executed to determine extracted trace data. Note that the actions performed at 702 might be similar to those described in connection with element 202 of FIG. 2.

At 704, a plurality of "location timelines" are graphically represented on a user display based on the extracted trace data. In addition, a plurality of item flow connections are graphically represented at 706 between location timelines on the user display based on the extracted trace data and times associated with the item flow connections.

Figure 8:
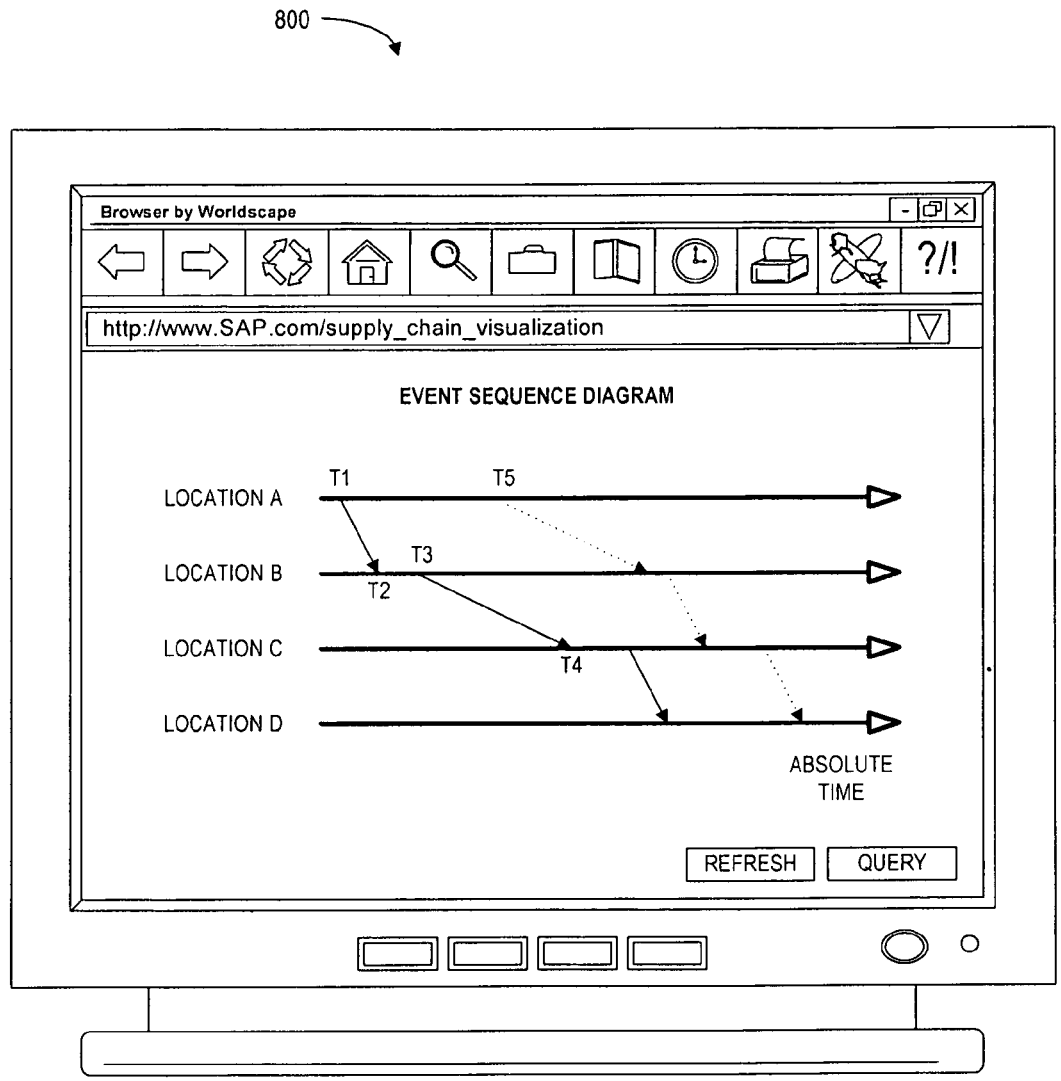
FIG. 8 illustrates an event sequence diagram according to some embodiments of the present invention.

For example, FIG. 8 illustrates an event sequence diagram 800 according to some embodiments of the present invention. In this case, one horizontal location timeline is associated with location A and another timeline is associated with location B. Moreover, a first event or item flow connection has been drawn from the timeline of location A to the timeline of location B (e.g., shown as a solid arrow in the diagram). This event or item flow connection might indicate, for example, that a particular item left location A at time T1 and arrived at location B at time T2. Similarly, that item later left location B at time T3 and arrived at location C at time T4. According to some embodiments, the event sequence diagram might be presented in a way similar to a Unified Modeling Language (UML) sequence diagram.

Figure 9:
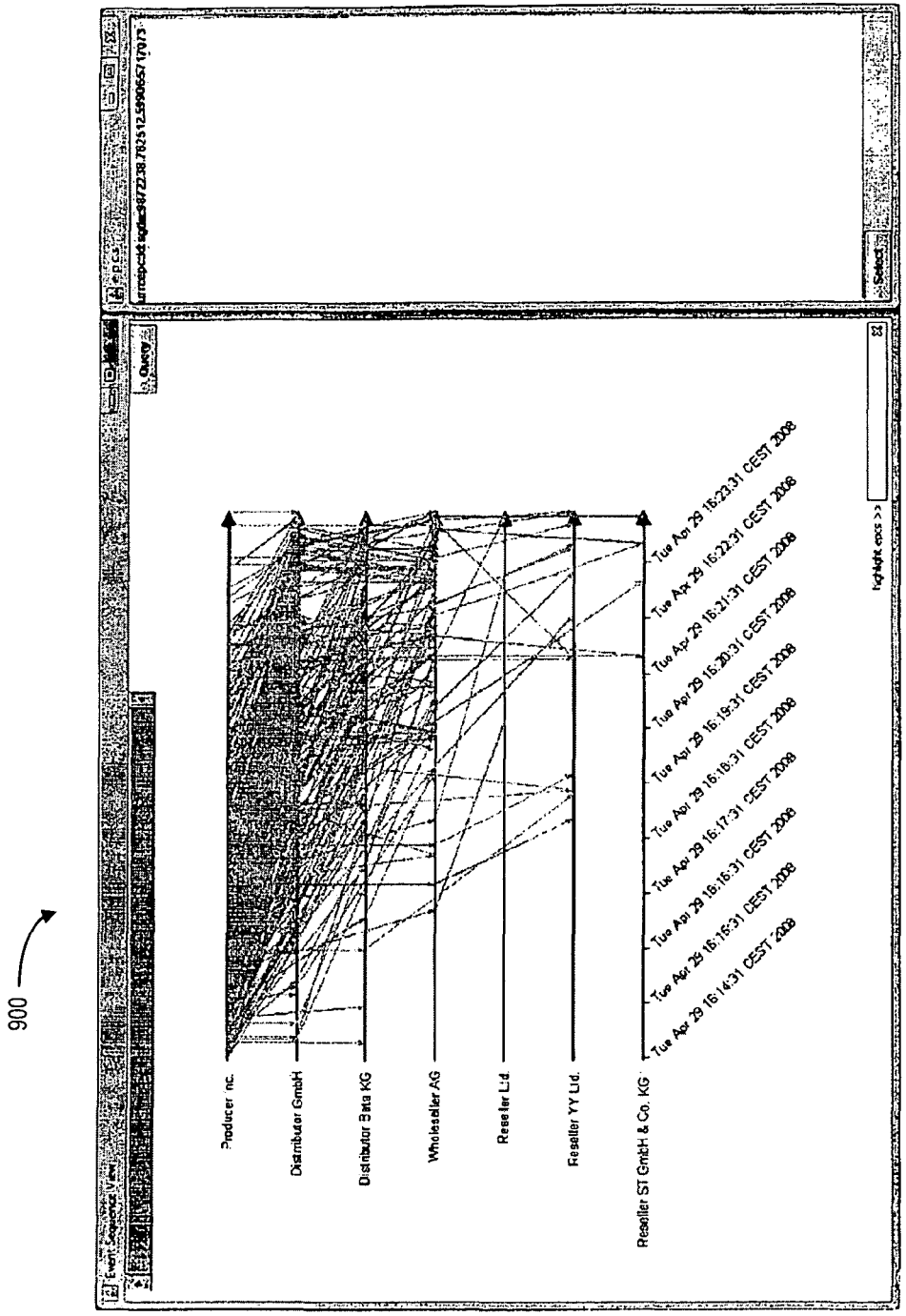
FIG. 9 is an example of an event sequence diagram according to some embodiments.

The dotted arrows illustrated in the diagram 800 might be associated with another product as it moves through the supply chain (e.g., beginning at time T5). Although events associated with only two items are illustrated in the diagram 800, note that an actual display might include information associated with substantially more items. For example, FIG. 9 is another example of an event sequence diagram 900 according to some embodiments.

Such an event sequence view may provide spatio-temporal traces of single items in the supply chain and may disclose a temporal succession of events (thus facilitating detection of unusual transport patterns and/or storage durations). For example, an expert user might examine an event sequence diagram to detect "transfer," "reuse," "randomize," and/or "duplicate" counterfeiting strategies.

Note that the timelines on the diagrams 800 and 900 represent "absolute time." That is, all of the timelines and connections are rendered with respect to an absolute and/or fixed external reference time. According to some embodiments, the times associated with each item flow connection are normalized before the item flow connection is graphically represented between location timelines.

Figure 10:
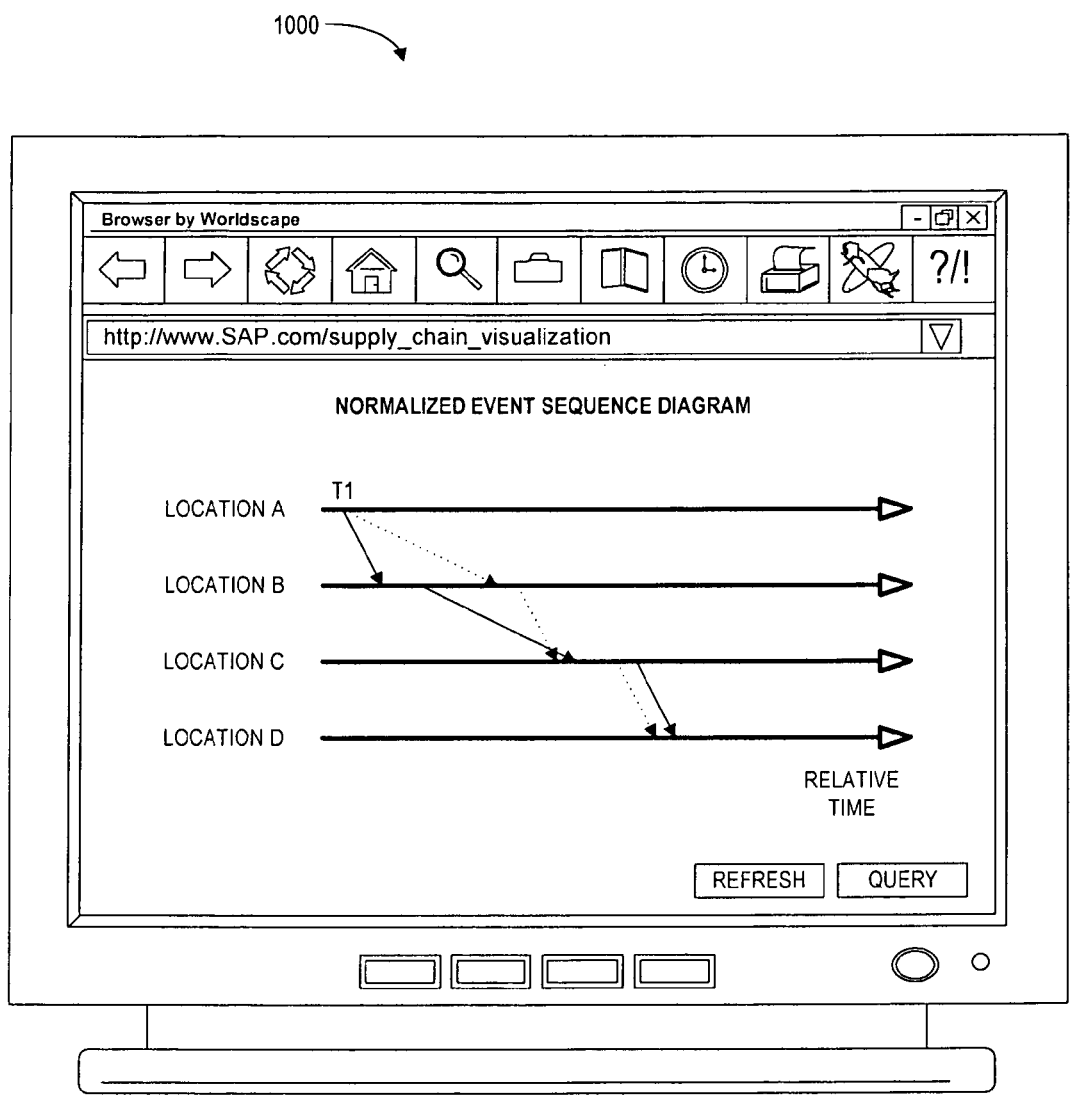
FIG. 10 illustrates a normalized event sequence diagram according to some embodiments of the present invention.

For example, FIG. 10 illustrates a normalized event sequence diagram 1000 according to some embodiments of the present invention. Note that events displayed in this diagram 1000 represent the same real-world events that were displayed on the event sequence diagram 800 of FIG. 8. In this diagram 1000, however, events associated with the second item (e.g., the dotted arrows) have been shifted on the timelines based on the difference between time T5 and time T1. Thus, all items appear to leave location A at "relative" time T1 (e.g., instead of an absolute time).

Figure 11:
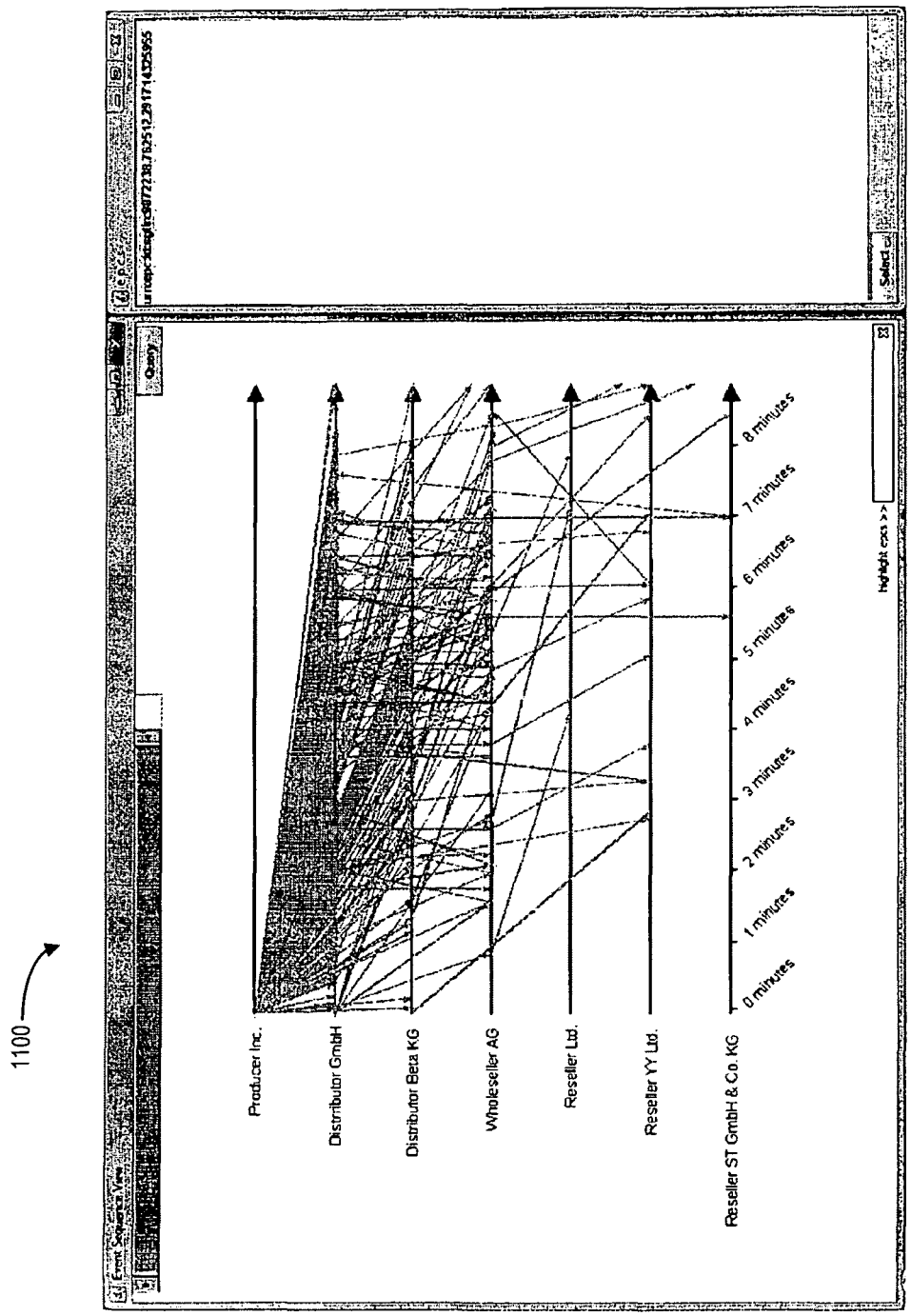
FIG. 11 is an example of a normalized event sequence diagram according to some embodiments.

Note that diagram 1000 might instead be normalized in other ways (e.g., such that all items appear to arrive at location B at the same time or leave location C simultaneously). Moreover, as before an actual display might include information associated with substantially more than two items. For example, FIG. 11 is another example of a normalized event sequence diagram 1100 according to some embodiments.

The normalized event sequence view may also provide spatio-temporal traces of items in the supply chain and may disclose further details associated with a temporal succession of events (and thus facilitate detection of unusual transport patterns and/or storage durations). For example, an expert user might examine an event sequence diagram to detect "transfer," "reuse," "randomize," and/or "duplicate" counterfeiting strategies. Note that even a casual user might be able to detect the use of a "randomize" counterfeiting strategy with such a display.

Figure 12:
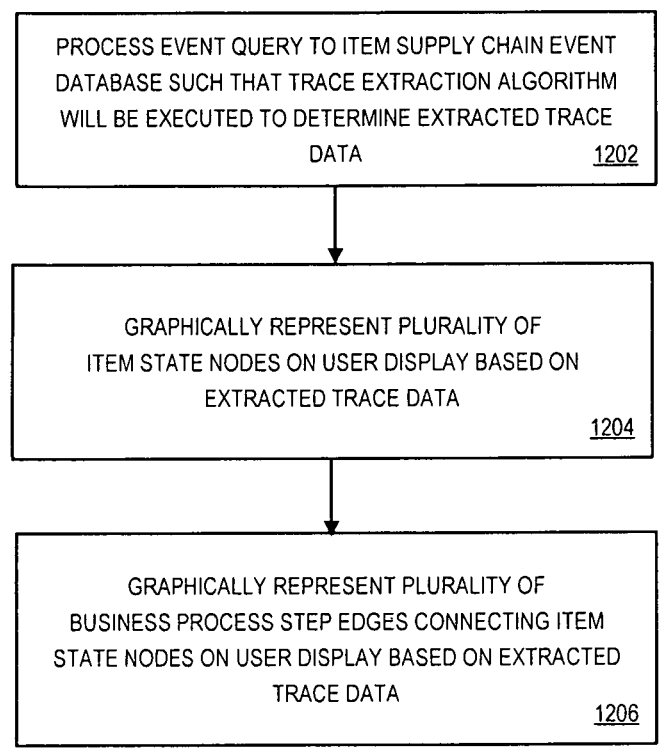
FIG. 12 is a flow diagram of a method providing a product state view pursuant to some embodiments of the present invention.

FIG. 12 is a flow diagram of a method providing a "product state view" pursuant to some embodiments of the present invention. At 1202, an event query to an item supply chain event database is processed such that a trace extraction algorithm will be executed to determine extracted trace data. Note that the actions performed at 1202 might be similar to those described in connection with element 202 of FIG. 2.

At 1204, a plurality of "item state nodes" are graphically represented on an interactive user display based on the extracted trace data. Content of the supply chain event database may be displayed, for example, by organizing records based on state information. Each item state node might be associated, for example, a legal or business related condition or characteristic of an item. For example, an item might currently be "in storage," "awaiting inspection" or "available for sale at a retail store." Note that an item "state" might be associated and/or extracted from with one or more fields in EPCIS data (e.g., the disposition field of an event specifies the business condition of the event's objects subsequent to the event).

At 1206, a plurality of business process step "edges" are graphically represented as connecting item state nodes on the interactive user display based on the extracted trace data. Each business process step edge might represent, for example, a transition from one item state to another. In general, a business step might specify, for example, "what business process step was taking place that caused the event to be captured?"

This type of "business process step" view may provide a user with business information about the goods in the supply chain. As items are detected from "read point" (e.g., where a product code is recorded) to read point, or, in an aggregate view, from one spatial aggregation of read points to another. Such a visualization might, for example, let a user (who knows the usual or probable business process steps through the supply chain) draw conclusions about product authenticity (e.g., when item state transitions depart from typical patterns). Consider, by way of example, a "reuse" strategy where a counterfeiter might remove an item identifier from an item that has been observed to be destroyed. In this case, a user viewing a product state view might become suspicious when he or she notice that products seem to "return to the supply chain from the waste bin."

Figure 13:
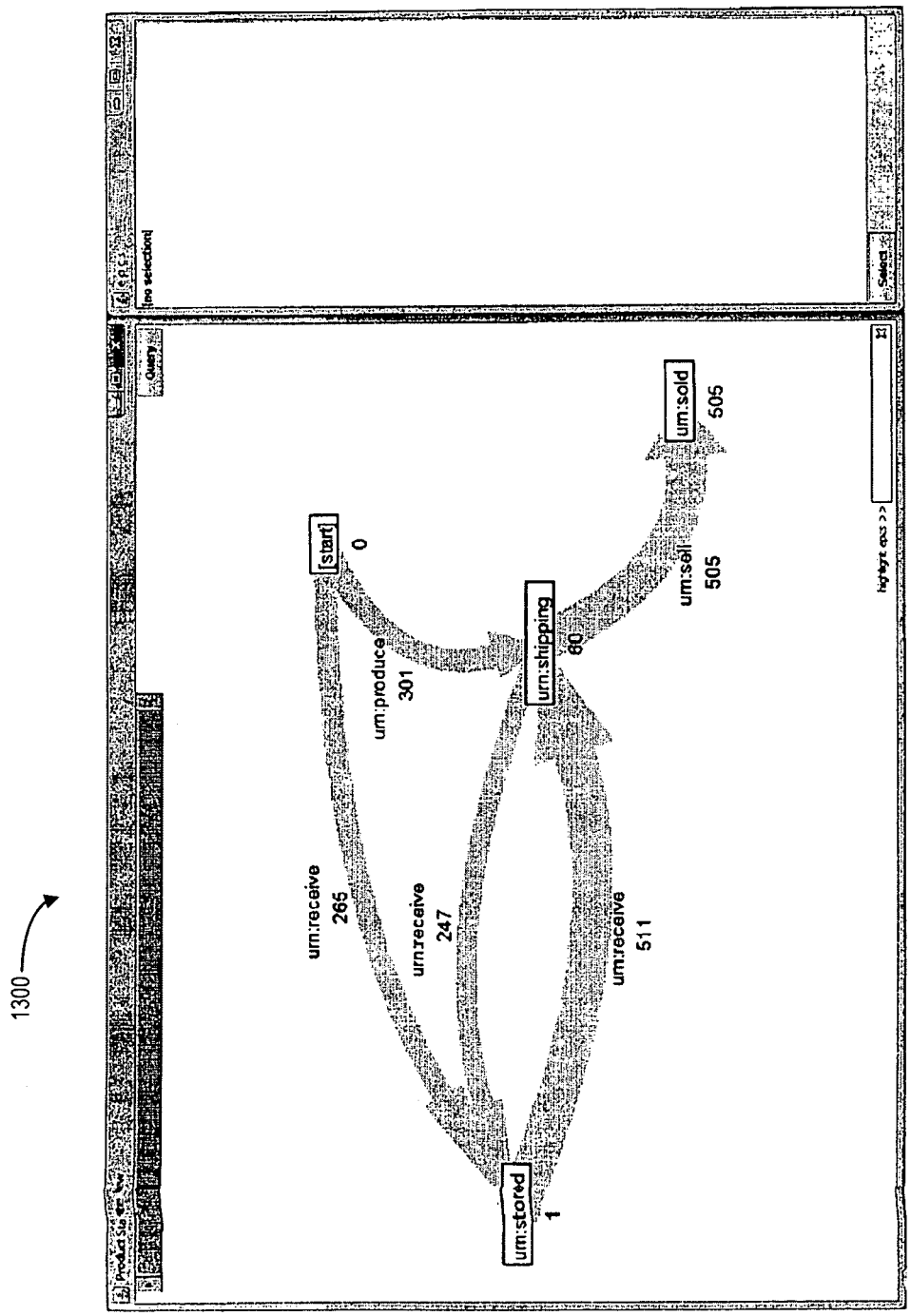
FIG. 13 is an example of product state view according to some embodiments.

FIG. 13 illustrates a business process step diagram 1300 according to some embodiments of the present invention. The diagram 1300 includes item state nodes (rendered as four rectangles on the display) representing item states: start, shipping, stored, and sold. Moreover, business process step edges are rendered as arrows connecting the four item state nodes, where each arrow or edge indicates a transition of an item from one item state to another.

In the diagram 1300 of FIG. 13, each business process step edge is displayed alongside with a numerical value and description that indicates the number of items associated with the edge. For example, the diagram 1300 indicates that 505 items transitioned from item state "shipping" to item state "sold" via a "sell" business process step.

According to some embodiments, a width or color of a business process step edge might further indicate information about the items transitioning between the item state nodes. For example, the business process step edge from item state "stored" to item state "shipping" in the diagram 1300 is associated with a relatively large number of items (i.e., 511 items) and is therefore displayed as a thicker arrow. As another example, edges associated with suspicious item transitions might be colored red while normal edges are colored green.

Note that product code data, such as EPCIS data, is typically voluminous and/or highly dimensional. By extracting trace data of interest and providing a two-dimensional diagram 1300 as illustrated in FIG. 13, the system may let a user efficiently and effectively detect potentially unauthorized and/or counterfeit items. For example, even a casual user might be able to view the diagram 1300 and determine that some of the item state nodes and/or business process step edges seem to be implausible. As a result, a user familiar with the normal life cycle of a product might determine when a "reuse," "randomize," or "duplicate" strategy is being employed by a counterfeiter (e.g., if an item re-appears in the supply chain after it enters a product state of "sold" or "destroyed").

According to some embodiments the product state view diagram 1300 is an interactive display. For example, a selection may be received from a user via the interactive display, the selection being associated with at least some of the graphically represented information. In some cases, a user might click (or double-click) a graphically rendered item state node or business process step edge on the diagram 1300. As a result, the graphical representation may be automatically and/or dynamically adjusted in accordance with the extracted trace data.

By way of example, a user might select a particular item state node and, in response to that selection, the automatic adjustment might include expanding that item state node to display a plurality of item "sub-state" nodes (similar to the location sub-nodes of FIG. 4). Such sub-nodes might be associated with, for example, a sub-structure of an item state (e.g., "awaiting inspection customs" might be a sub-state of "in transit"). Note that in some embodiments, the system might further graphically display new business process step edges between the sub-item state nodes. According to some embodiments, a user may provide a further selection to "collapse" the sub-nodes back to their original form.

As another example, a user might select a particular business process step edge and, in response to that selection, the automatic adjustment might include expanding that business process step edge to display a plurality of business process step "sub-edges" (e.g., each associated with a different product category). According to some embodiments, a user may provide a further selection to "collapse" the sub-edges back to their original form.

As still another example, an interactive user display might allow for the selection of a dynamically adjusted time window associated with the graphically represented information. For example, a user might select events from a start date or time to an end date or time. As another example, the user might ask to see all events that occurred in the last week or year. As still another example, the user might request that data representing the last 100 state transition events be provided on a product state view diagram. According to some embodiments, such a selection received from the user via a graphical time slider control (e.g., similar to the "Time Window" bar of FIG. 5).

Figure 14:
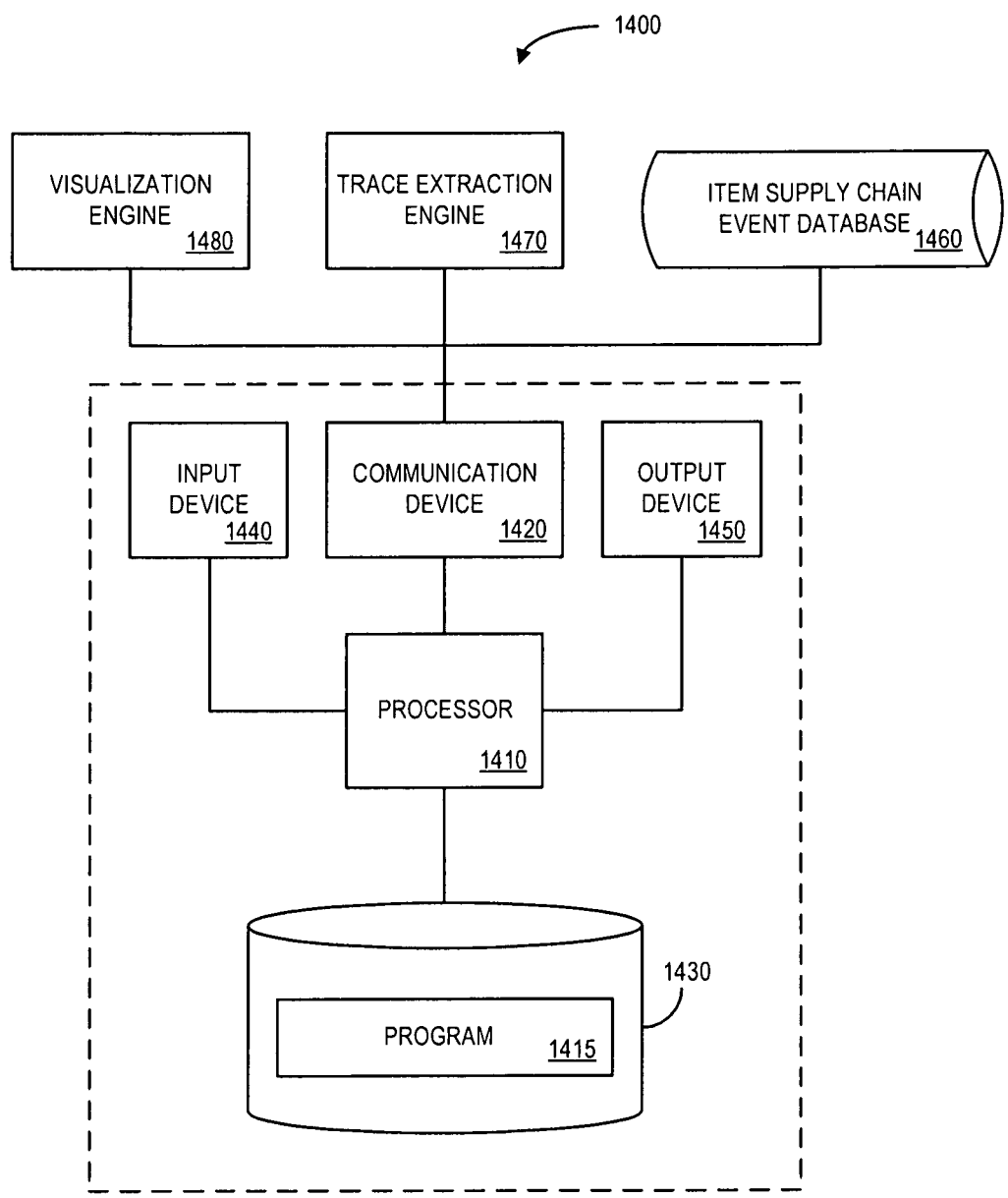
FIG. 14 is a block diagram of a supply chain event visualization system according to some embodiments.

FIG. 14 is a block diagram of a supply chain event visualization system 1400 according to some embodiments. The supply chain event visualization system 1400 comprises a processor 1410, such as one or more INTEL® Pentium® processors, coupled to a communication device 1420 configured to communicate via, for example, (i) a temporary computer communication channel, (ii) a computer communication channel potentially accessible by a number of unrelated client devices, (iii) a public computer communication network, and/or (iv) any other type communication channel or network. The communication device 1420 may be used to communicate, for example, with one or more client devices and/or devices associated with a remote supply chain event server.

The processor 1410 may further be coupled to an input device 1440, such as a computer keyboard, mouse, or touch screen (e.g., to receive query information or adjustments from a user). Similarly, the processor 1410 may be coupled to an output device 1450, such as a computer monitor (e.g., to display supply chain event information to a user).

The processor 1410 is also in communication with a storage device 1430. The storage device 1430 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 1430 stores a program 1415 for controlling the processor 1410. The processor 1410 performs instructions of the program 1415, and thereby operates in accordance with any of the embodiments of the present invention described herein. For example, the processor 1410 may arrange for an event query to an item supply chain event database 1460 to be processed such that a trace extraction algorithm will be executed to determine extracted trace data. A plurality of location nodes may then be graphically represented on an interactive user display based on the extracted trace data. Similarly, a plurality of item flow edges connecting location nodes may be graphically represented by the processor 1410 on the interactive user display based on the extracted trace data. According to some embodiments, a selection from a user is received via the interactive user display, the selection being associated with at least some of the graphically represented information. Responsive to the received selection, the graphical representation may be adjusted in accordance with the extracted trace data.

As used herein, information may be "received" by or "transmitted" to, for example: (i) the supply chain event visualization system 1400 from a user or a remote supply chain event server; or (ii) a software application or module within the supply chain event visualization system 1400 from another software application, module, or any other source.

The system 1400 may further include a trace extraction engine 1470 to execute an event query in connection with an event query request to determine extracted trace data from information stored in the item supply chain event database 1460. The trace extraction engine 1470 and/or item supply chain event database 1460 may be associated with, for example, a backend EPCIS repository to store and retrieve event data. According to some embodiments, the trace extraction engine 1470 and/or visualization engine 1480 may be co-located with and/or coupled to the processor 1410 (instead of via the communication device 1420).

The system 1400 may further include a visualization engine 1480, coupled to the trace extraction engine 1470, to arrange for the graphical representation of: (i) a plurality of location nodes based on the extracted trace data, and (ii) a plurality of item flow edges connecting location nodes based on the extracted trace data. The visualization engine 1480 might be implemented, for example, using a Java application.

The system 1400 may further include a user interface engine (e.g., associated with the processor 1410 and/or visualization engine 1480) to: (i) receive a selection from a user, the selection being associated with at least some of the graphically represented information, and (ii) responsive to the received selection, arrange for the graphical representation to be adjusted in accordance with the extracted trace data.

According to some embodiments, some of the elements of the system 1400 may be located at a client device (e.g., as represented by the dashed box of FIG. 14). Moreover, some or all of the elements might be associated with a counterfeit detection system. Note, however, any of the trace extraction engine 1470, the visualization engine 1480, the user interface engine, and/or the item supply chain event database 1460 may be located at a user client device remote from a supply chain information server. Similarly, any of the trace extraction engine 1470, the visualization engine 1480, the user interface engine, and/or the item supply chain event database 1460 may instead be located at a supply chain information server remote from a user client device.

Typically, a flow of goods from producer to consumer in a supply chain will generate a set of events that are temporally and/or spatially separated. The data might be achieved, for example, using technologies such as EPCIS with options to use unique identifiers such as EPC tags and/or RFID tags. For example, an EPC might include a format header and three numeric parts: (i) a company prefix, (ii) an item reference or product type, and (iii) a unique serial number of an individual item. Thus, the following might represent a complete EPC:

urn:epc:id:sgtin:0614141.100734.1234567

Information about a series of events, including the associated EPCs, may be stored into and/or retrieved from the item supply chain event database 1460.

In a pre-processing operation, unordered EPCIS events may be processed by the trace extraction engine 1470 with a method called Trace Extraction. Given a set of EPCIS events, the Trace Extraction algorithm may extract the Traces of all items found in the event set. The Trace of an item is defined, for example, as the time-ordered list of all EPCIS events related to the Item. It comprise, for example, a trail of observations that may enable reconstructing and eventual visualization of the item's path through the supply chain. An item may comprise, for example, any physical object with an identifier. An event may be related to all items whose identifiers it explicitly names, plus all items that are contained in these items, and the items in these items, and so on, recursively. Which items are contained within which other items may be reproduced, for example, from EPCIS events of type AggregationEvent.

The trace extraction engine 1470 may receive an arbitrary set of EPCIS events and return a dictionary that maps each identifier to its associate Trace. The algorithm may, for example, first sort the input list by event time. Then it may process each of the events, one at a time. For each event, all identifiers that are related to the event (referred to as "stakeholder identifiers") may be determined. The event may then be appended to the Trace of each stakeholder identifier, retrievable from the output dictionary. If an identifier has no Trace, an empty Trace may created for it and inserted into the output dictionary.

The stakeholder identifiers can be determined, for example, by keeping an internal dictionary that maps an identifier to a list of other identifiers. Each time an AggregationEvent is processed, the associated identifier list may be retrieved from this dictionary. If the event has action type ADD, the event's ChildEPCs may be added to this list (perhaps avoiding duplicates). If the event has action type DELETE, the ChildEPCs may be removed from the list. If the dictionary does not yet have an entry for a requested identifier, it may be created and associated with an empty list.

Figure 15:
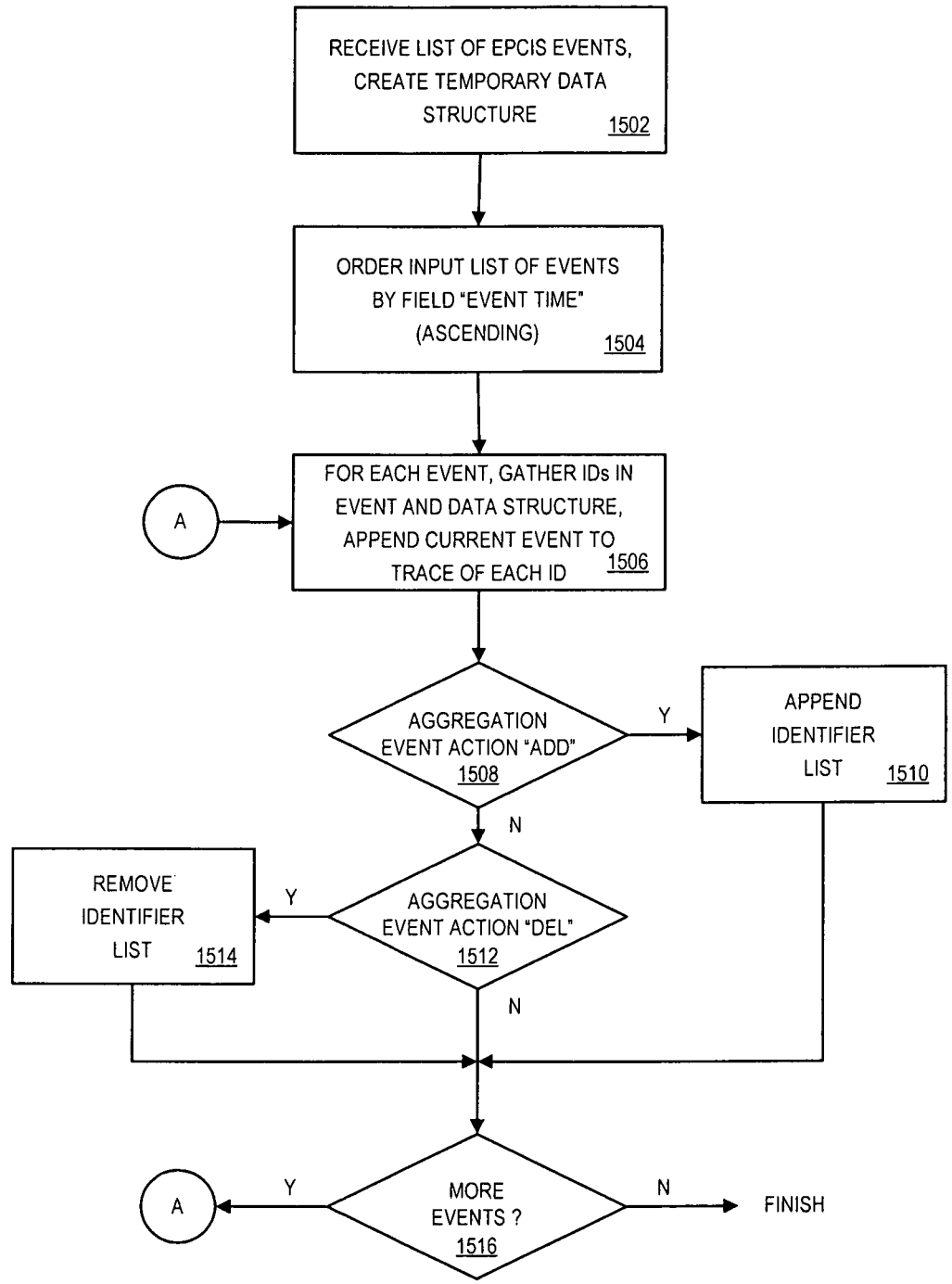
FIG. 15 is a flow diagram of a trace extraction algorithm pursuant to some embodiments of the present invention.

FIG. 15 is a flow diagram of such a trace extraction algorithm that may be performed, for example, by the trace extraction engine 1470 of FIG. 14 pursuant to some embodiments of the present invention. At 1502, a list of EPCIS events may be received. The events might be formatted, for example, in accordance with the EPCIS Version 1.0.1 Specification (2007) published by EPCglobal Inc. The output of the method illustrated in FIG. 15 might comprise, for example, the Traces of all identifiers in the event list (where the "Trace" of an identifier is a time-ordered list of all EPCIS events related to that identifier).

The trace extraction engine 1470 may also create and initiate a temporary stakeholder data structure (e.g., of type dictionary), that, given an identifier, will return a list of identifiers. At 1504, the trace extraction engine 1470 may order the input list of events by the field EventTime (e.g., in an ascending order).

At 1506, for each event in the event list, the trace extraction engine 1470 may gather all identifiers listed in the event. Depending on the event type, this might be associated with the following fields: (a) EPCList for ObjectEvent, (b) ChildEPCs and ParentID for AggregationEvent, (c) EPCList and ParentID for TransactionEvent, and (d) EPCClass for QuantityEvent. The trace extraction engine 1470 may also gather all stakeholder identifiers for the just gathered identifiers from the internal stakeholder data structure. Then, for these stakeholder identifiers also, the trace extraction engine 1470 may get the stakeholder identifiers, and so on, recursively, until there are no more new identifiers. If there is no entry in the data structure for an identifier, one may be created and mapped to an empty list. Also at 1506, the trace extraction engine 1470 may append the current event to the Trace of each identifier and stakeholder identifier that have been gathered.

At 1508, it is determined whether the current event is an AggregationEvent with action "ADD." If so, the stakeholder identifier list for the current event's ParentID is retrieved from the stakeholder data structure at 1510. The trace extraction engine 1470 may then append all identifiers in the event's field ChildEPCs, avoiding duplicates.

At 1512, it is determined whether the current event is an AggregationEvent with action "DELETE." If so, the stakeholder identifier list for the current event's ParentID is retrieved from the stakeholder data structure at 1514. The trace extraction engine 1470 may then remove from it all identifiers in the event's field ChildEPCs.

If the are more events to be processed at 1516, the method continues with the next event at 1506. If there are no more events to be processed at 1516, the method ends and the Traces of all identifiers in the event list may be provided for eventual use in the visualization of a supply chain.

Thus, embodiments may improve the ability of a user to view information about items moving through a supply chain. Moreover, one or more tools may be provided for a user that facilitate a user's ability to detect potential counterfeit items in an efficient and convenient manner. For example, the various visualizations described herein may help an expert (or even casual) user locate potential counterfeits associated with various counterfeit strategies.

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although particular displays have been described herein, note that other types of supply chain event visualization may be provided in accordance with any of the embodiments provided herein. For example, an interactive display similar to the event sequence diagram of FIG. 8 might be provided (e.g., a user might select a particular location timeline to view a number of different timelines for associated sub-locations). Similarly, a display similar to the event sequence diagram of FIG. 8 might be provided where each horizontal timeline is associated with a particular item state (and the connections represent transitions between those states).

Moreover, although embodiments have been discussed in connection with counterfeit detection, note that the visualization tools may be used in connection with other goals. For example, any of the embodiments described herein might help to detect other types of fraudulent behavior in a supply chain (an unauthorized or illegal transfer of an authentic product).

The several embodiments described herein are solely for the purpose of illustration. Persons skilled in the art will recognize from this description other embodiments may be practiced with modifications and alterations limited only by the claims.

What is claimed is:

1. A method associated with an item supply chain, comprising:

processing an event query to an item supply chain event database such that a trace extraction algorithm will be executed to determine extracted trace data; graphically representing a plurality of location timelines on a user display based on the extracted trace data; and graphically representing a plurality of item flow connections between location timelines on the user display based on the extracted trace data and times associated with the item flow connections.

2. The method of claim 1, wherein the times associated with each item flow connection are normalized before the item flow connection is graphically represented between location timelines.

3. The method of claim 2, further comprising:

receiving a selection from a user via the user display, the selection being associated with a particular location timeline; and responsive to the received selection, automatically expanding the selected location timeline into a plurality of sub-location timelines.

* * * * *